United States Patent [19]

Randell et al.

[11] 4,164,017

[45] Aug. 7, 1979

[54] COMPUTER SYSTEMS

[75] Inventors: Brian Randell, Newcastle-upon-Tyne; Ronald Kerr, Whitley Bay; Peter M. Melliar-Smith, Heddon Banks; Hugh C. Lauer, Newcastle-upon-Tyne, all of England; James J. Horning, Willowdale,, Canada

[73] Assignee: National Research Development Corporation, London, England

[21] Appl. No.: 568,683

[22] Filed: Apr. 16, 1975

[30] Foreign Application Priority Data

Apr. 17, 1974 [GB] United Kingdom ............ 16766/74

[51] Int. Cl.² .................. G06F 9/20; G06E 9/19; G06F 11/00; G06F 13/00
[52] U.S. Cl. .................. 364/200; 235/303.1
[58] Field of Search .................. 444/1; 445/1; 340/172.5; 235/153, 303, 303.1, 304, 304.1, 304.2; 364/200 MS File, 900 MS File

[56] References Cited

U.S. PATENT DOCUMENTS

| | | | |
|---|---|---|---|
| 3,517,171 | 6/1970 | Avizienis | 235/153 |
| 3,533,082 | 10/1970 | Schnabel et al. | 340/172.5 |
| 3,618,042 | 11/1971 | Miki et al. | 340/172.5 |
| 3,636,331 | 1/1972 | Amrehn | 235/151.12 |
| 3,688,274 | 8/1972 | Cormier et al. | 340/172.5 |
| 3,707,725 | 12/1972 | Dellheim | 444/1 |
| 3,736,566 | 5/1973 | Anderson et al. | 340/172.5 |
| 3,805,038 | 4/1974 | Buedel et al. | 235/304 |
| 3,814,919 | 6/1974 | Repton | 235/153 AK |
| 3,824,383 | 7/1974 | Inose et al. | 235/303.1 |
| 3,931,504 | 1/1976 | Jacoby et al. | 364/200 |
| 3,937,938 | 2/1976 | Matthews | 364/200 |
| 3,974,480 | 8/1976 | Gernelle | 364/200 |
| 3,984,814 | 10/1976 | Bailey et al. | 364/200 |
| 4,016,543 | 4/1977 | Cranks et al. | 364/200 |
| 4,048,481 | 9/1977 | Bailey et al. | 364/200 |
| 4,073,005 | 2/1978 | Parkin et al. | 364/200 |

*Primary Examiner*—Gareth D. Shaw
*Assistant Examiner*—Rhoads, Jan E.
*Attorney, Agent, or Firm*—Cushman, Darby & Cushman

[57] ABSTRACT

A data processor has provision for error recovery by the division of a program into a set of program blocks. The apparatus has a main store and a cache store that preserves the states that have previously been taken up by items of information prior to commencing each block so that the states of the items of information prevailing at the beginning of a block can be restored if required.

8 Claims, 13 Drawing Figures

```
DECLARE N
RECOVERY BLOCK I
    ACCEPTANCE TEST It              Fig. 1
    PRIMARY BLOCK Ia
        DECLARE M
        PROGRAM
        RECOVERY BLOCK II
            ACCEPTANCE TEST IIt
            PRIMARY BLOCK IIa
                DECLARE J
                PROGRAM
            ALTERNATE BLOCK IIb
                DECLARE K
                PROGRAM
            ALTERNATE BLOCK IIc
                DECLARE L
                PROGRAM
        PROGRAM
    ALTERNATE BLOCK Ib
        DECLARE L
        PROGRAM
        RECOVERY BLOCK III
            ACCEPTANCE TEST IIIt
            PRIMARY BLOCK IIIa
                PROGRAM
            ALTERNATE BLOCK IIIb
                PROGRAM
        RECOVERY BLOCK IV
            ACCEPTANCE TEST IVt
            PRIMARY BLOCK IVa
                PROGRAM
        PROGRAM
```

DECLARE N
N := 1

DECLARE M
M := 2
N := 3

DECLARE J
J := 3

M := 4

N:= M+1

M:= 6

II t PASSED

I t FAILED

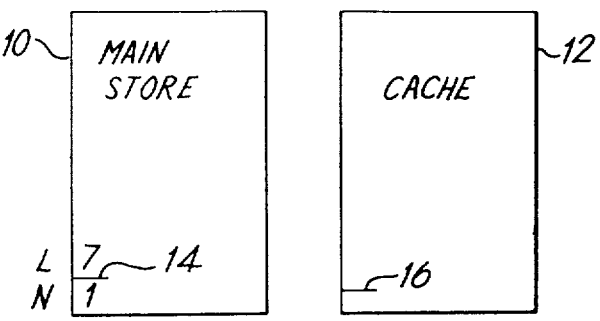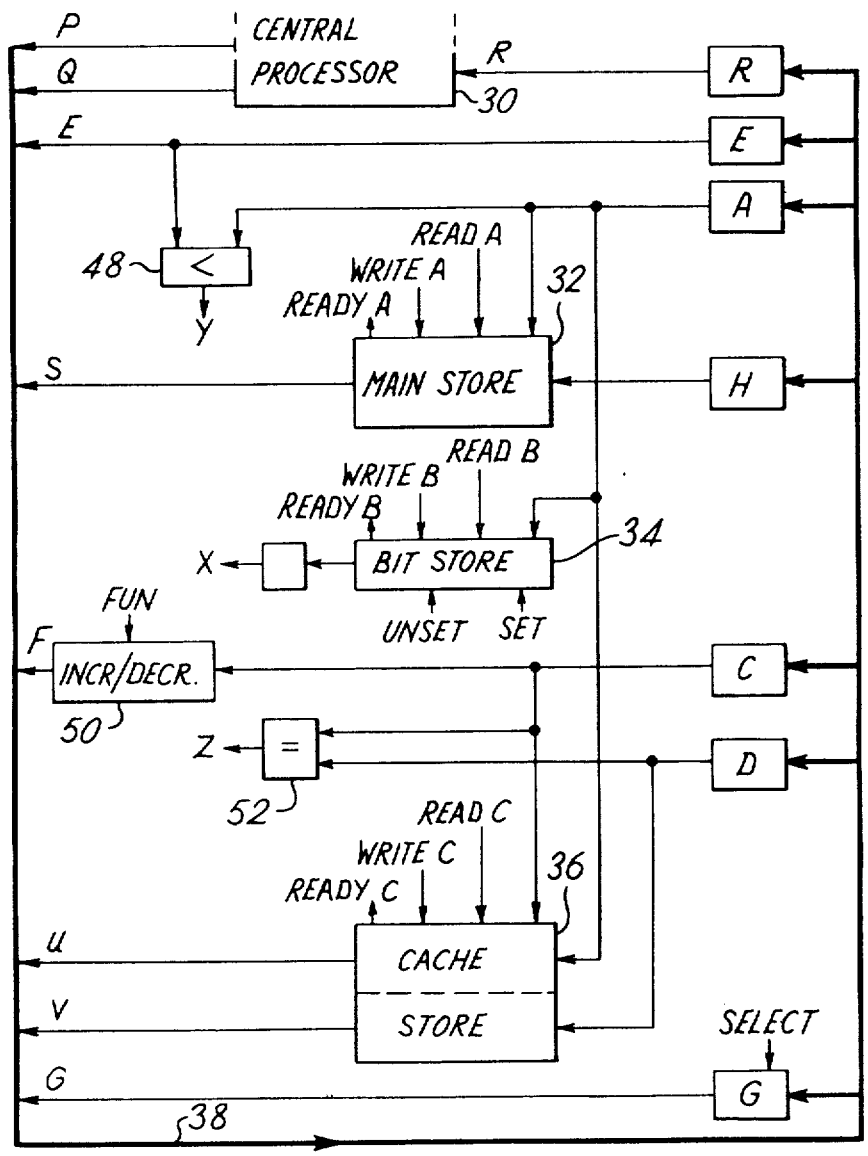

4,164,017

COMPUTER SYSTEMS

BRIEF SUMMARY OF THE INVENTION

This invention relates to computer systems and similar devices which perform actions in order to manipulate the states or values of items of information.

A program to be carried out on a computer system is constructed from identifiable operations, each of which constitutes a block and consequently the complete program can be regarded as a set of blocks. Many blocks are themselves constructed from further smaller blocks so that the complete program forms a nested set of blocks. On completion of a block, it is frequently desired to restore the apparatus to state in which it was at the beginning of the block. One way of doing this is to make a separate record in the memory of the computer to the initial states of all items of information in the system. This is extremely wasteful of storage capacity since, in many blocks, only a comparatively small number of such items of information will change.

According to the invention, there is provided data processing apparatus for use with a central processor of a computer system or similar device in processes comprising a set of program blocks, said apparatus being operative to preserve the state taken up by each of a plurality of items of information at the beginning of each block where said items of information change state during such block so that the conditions prevailing at the beginning of the block can be restored, said apparatus comprising first memory means for storing the most recent state of each of said items of information, second memory means for storing previous states of said items of information, means responsive to said second memory means for transferring the existing state of an item of information from said first memory means to said second memory means when the state of said item of information changes and restoring to the first memory means the state of an item of information stored in the second memory means, and means for associating additional information with said items of information to control said transfer and restoration.

In one form of the invention, said means for associating additional information with the items of information comprises further memory means addressable with said first memory means for determining whether there is a need to preserve the state of each item of information in said first memory means if said item of information changes state during the current block.

Each of said items of information may comprise a variable, the various states of the items of information comprising values assigned to such variables. Alternatively, said items of information may be vectors, complex list structures, procedure parameters, recursive procedures, heaps or own variables.

The various memory means may take the form of a single memory device. Alternatively, each memory means may constitute a separate device or any two of the memory means may be grouped together in a single device. The memory means store words (i.e. groups of digits of fixed length) in each of their storage locations, but the items of information can be shorter or longer than a storage word. In embodiments of the invention the memory means may be organised as stacks. A stack is a form of store into which words to be stored are entered in linear sequence commencing at the bottom.

BRIEF DESCRIPTION OF THE DRAWINGS

A fuller understanding of the invention may be had from the following description of an embodiment thereof and of its application to error detection and recovery, given by way of example, with reference to the accompanying drawings, in which:

FIG. 1 is a schematic representation illustrating a part of a program structure with which the invention may be used;

FIGS. 2 to 10 are block diagrams illustrating the state of the various memory means at various stages during performance of the program illustrated in FIG. 1;

FIG. 11 is a block diagram of apparatus in accordance with one embodiment of the invention;

DETAILED DESCRIPTION OF THE INVENTION

Figure 2:
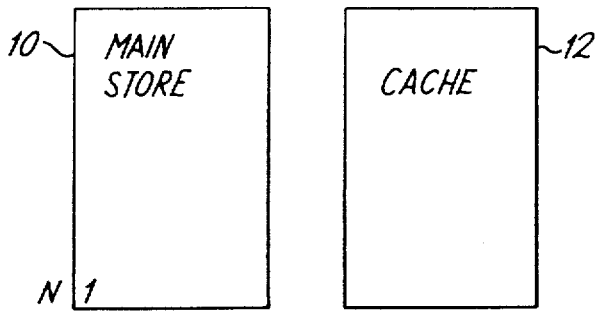

A computer program having provision for error recovery in accordance with the invention is constructed from a number of identifiable operations for error recovery, many of which are constructed from further smaller operations. A set of operations grouped together for purposes of permitting recovery from errors is herein referred to as a 'recovery block'. Each recovery block must contain a primary block and an acceptance test. In addition, it may contain one or more alternate blocks. Each such primary or alternate block may itself constitute or contain a recovery block containing at least a primary block and an acceptance test.

FIG. 1 illustrates a recovery block I having an acceptance test I t. It contains a primary block I a and an alternate block I b. The primary block I a contains a recovery block II comprising an acceptance test II t, a primary block II a and two alternate blocks II b and II c. The alternate block I b contains two recovery blocks III and IV. The recovery block III comprises an acceptance test III t, a primary block III a and an alternate block III b. The recovery block IV comprises an acceptance test IV t and a primary block IV a. For ease of understanding double vertical lines define the extents of recovery blocks while single vertical lines define the extents of primary and alternate blocks.

Each acceptance test is a section of program which is invoked on exit from a primary or alternate block. It provides a binary decision as to whether the operation required of the recovery block has been performed acceptably to the program which encloses or invokes the recovery block. For each recovery block, there is a single acceptance test invoked on exit from the primary block and also invoked on exit from any alternate block should an alternate be required. If the primary of a recovery block is rejected, the program must perform an alternate. When his alternate terminates, its results are submitted to the same acceptance test and, should the acceptance test be satisfied, the program proceeds using the result generated by the alternate. If the acceptance test is again not satisfied, then a further alternate is tried. Should all the alternate blocks have been tried, and all have failed to satisfy the acceptance test, then the entire recovery block must be regarded as having failed. This requires the rejection of the enclosing block which invokes the recovery block. The alternate to that enclosing block must be attempted instead.

The acceptance test does not lie within the primary block and consequently cannot access local variables of the primary or alternate blocks; there is no reason why local declarations in an alternate block need be the same as local declarations in the corresponding primary block. Whether an acceptance test is passed or failed, local declarations made during the block which caused success or failure must be discarded to put the system in the same condition as it was in when the block started so that the alternate block can be written in a conventional manner if it is desired that the design of the alternate block is not affected by the prior unacceptable execution of the primary block, or by the changes to the values of variables which that execution may have caused. Thus, when an alternate block is entered, it is presented with exactly the same environment as was the corresponding primary block when it was entered. All the operations of the primary block have been undone and all the variables altered by the primary have been restored to their previous values. A fuller discussion of the requirements for such an error recovery system is given in B. Randell, "Research On Computing System Reliability at the University of Newcastle-upon-Tyne, 1972/73", Tech. Report 57, Computing Laboratory, University of Newcastle-upon-Tyne (January 1974).

One application of the invention, which will now be described by way of example, is to the provision of means for enabling the variables altered by a primary or alternate block to be restored to their previous values with reasonable efficiency. Briefly, this is done by recording in a separate storage means, hereinafter referred to as a cache store, the identities of those variables modified by a primary or alternate block together with the values of those variables before the first such modification. The identities are arranged to contain sufficient information to determine to which variable each recorded value pertains and may, for example, comprise the addresses or virtual addresses of such variables. In the embodiment of the invention now being described, both the main store and the cache store are organised as stacks. Since only the values of the variables on entry to a recovery block need to be preserved, there being no need to preserve any intermediate values of variables which change more than once during a recovery block, an indicator or a boolean flag is associated with each word in the main store to indicate whether or not the relevant value has already been preserved in the cache store.

FIGS. 2 to 9 illustrate the state of the main store and cache store during performance of the primary block I a and the start of the alternate block I b of FIG. 1. The particular declared values of the variables are given by way of example.

FIG. 2 illustrates the situation prior to entry to recovery block I. The variable N is declared and assigned the value 1. The act of declaring the variable N allocates a address to it at the bottom of the main store 10. At this time, the cache store 12 is empty.

Figure 3:
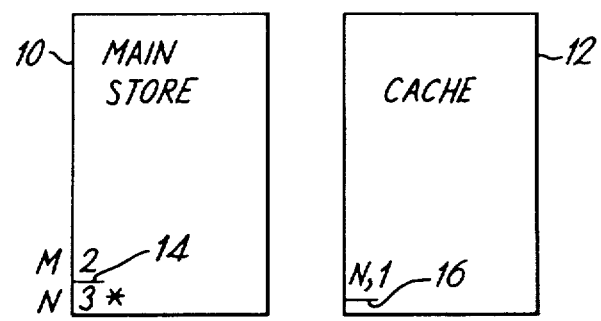

FIG. 3 illustrates the situation during primary block I a. First of all stack marks 14 and 16 are placed in the main store 10 and the cache store 12 respectively. The stack marks indicate the commencement of a recovery block. During the program run of primary block I a, assume that the variable M is declared and assigned the value 2. The assigned value 2 is entered into the main store 10 at the address of the variable M which is above the stack mark 14. Also during the program run of block I a assume that a new value 3 is assigned to the variable N. The address of the variable N in the main store 10 and its original value are inserted into the cache store 12 above the stack mark 16 and the boolean flag at the address of N in the main store 10 is set (indicated by an asterisk).

Stack marks such as 14 and 16 indicate the beginning of main store and cache regions respectively associated with a recovery block. Any entries in either the main store 10 or the cache store 12 above the top stack mark must have been made during the current block.

Figure 4:
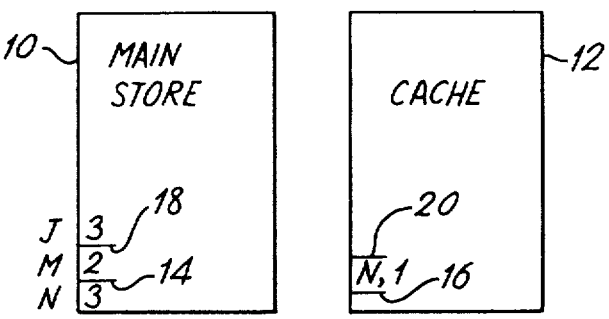

At a stage in the program run in primary block I a recovery block II is entered and FIG. 4 illustrates the situation during its primary block II a. At the commencement of recovery block II further stack marks 18 and 20 are set in the main store 10 and the cache store 12 respectively and the boolean flag against the variable N in the main store cleared since there is no longer a value for the variable N stored in the cache store 12 above the top stack mark. Assume that during primary block II a the variable J is declared and assigned the value 3. This assigned value is entered into the main store 10 above the stack mark 18.

Figure 5:
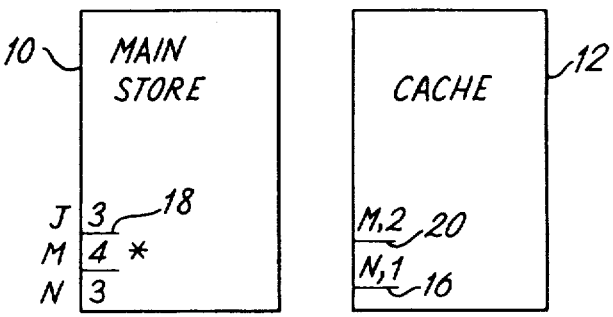

Referring to FIG. 5, it is assumed that during primary block II a, the value 4 is assigned to the variable M. The variable M was declared before the beginning of the current block and consequently its position in the main store 10 is below the stack mark 18 which marks the commencement of recovery block II. Both the address and the original value of the variable M are entered into the cache store 12 above the stack mark 20, the local value 4 of the variable M is entered into the main store 10 and the boolean flag (indicated by an asterisk) at the address M in the main store 10 is set.

Figure 6:
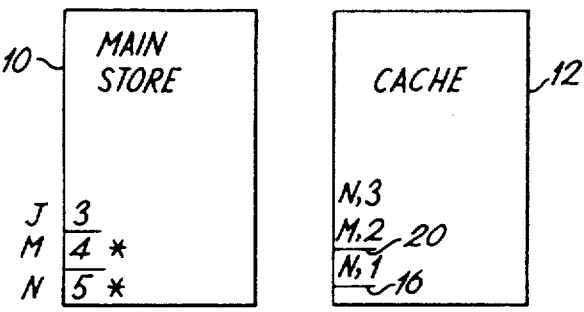

Referring to FIG. 6, also in the program run of primary block II a, assume that the value M+1 is assigned to the variable N. The address and immediately preceding value of the variable N are entered into the top of cache store 12, the local value of the variable N is entered into the main store 10 and the corresponding boolean flag set.

Figure 7:
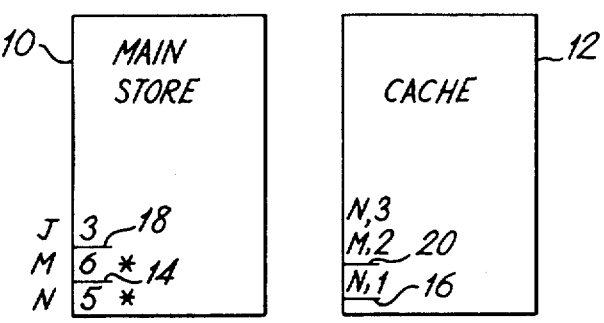

Next, referring to FIG. 7, assume a second local assignment to the variable M, say 6, is made in the program run of primary block II a. The fact that this is not the first assignment by an operation in this block is indicated by the pre-existence of a set boolean flag corresponding to the address for the variable M in the main store 10. Consequently, the new value for the variable M is entered into the main store 10 but the immediately previous value is not entered into the cache store (an earlier value having been already entered). Such entry is inhibited by the presence of a boolean flag at address M. The boolean flag, of course, remains set.

Figure 8:
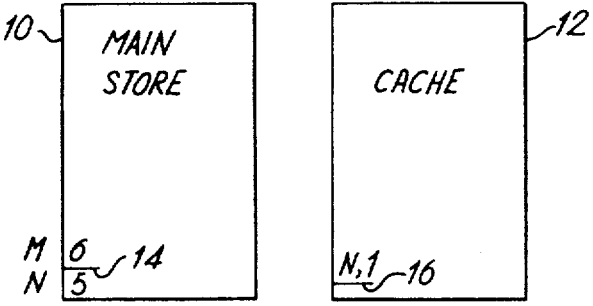
Figure 9:
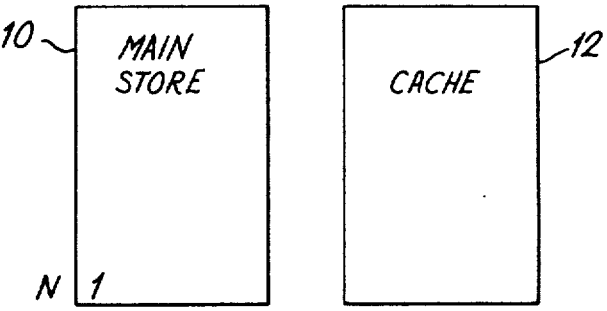

FIG. 8 illustrates the circumstances when the acceptance test II t for recovery block II has been attempted at the end of primary block II a and has indicated that the test has been satisfied. The stack in the main store 10 is chopped at the top stack mark 18 marking the commencement of recovery block II so that the local variable J is discarded. All the flags are cleared, then the flags are set for variables which have entries in the top-but-one region of the cache store 12 (between stack marks 16 and 20). These entries in the cache store were made in recovery block I prior to the commencement of recovery block II. This restores the record of which variables had already been cached when the current recovery block II was entered. All the entries in the cache store 12 above the stack mark 16 are then processed. Those whose addresses signify that they are for variables local to the enclosing recovery block I (i.e. the addresses above that of the stack mark 14) are discarded, for example the entry M,2. Those which correspond to variables for which there already exist entries in the top-but-one region of the cache store 12 are discarded since those variables have already been cached in the enclosing recovery block I, for example the entry N,3. Had there been further entries above stack mark 20, they would have been moved down into the top-but-one region of the cache store 12 such that they resided in contiguous words beginning at that formerly occupied by stack mark 20. For each such entry which is not discarded, for example the entry N,1 the boolean flag corresponding to the variable designated by the virtual address is set, recording that those variables have also, in effect, been cached in the enclosing recovery block I. When return is made from the current recovery block II to the enclosing recovery block I, the top-but-one region of the cache store 12 (above stack mark 16) becomes the top region. Since the acceptance test II t has been passed, the program now exits from the primary block I a to attempt acceptance test I t which, it is assumed by way of example, is not satisfied. The mechanism must restore the values of variables as though the block I a had never been executed. The variable M is local to block I a and is therefore discarded. The variable N has been changed in block I a and its prior value recorded in the cache store. This prior value (1) is restored and the flag for variable N is cleared. The stack marks 14 and 16 are removed from the main store 10 and cache store 12 respectively. The state of the stores 10 and 12, as shown in FIG. 9, are now exactly as if block I a has never been entered, i.e. exactly the same as in FIG. 2.

Since the acceptance test I t has failed, the program proceeds to alternate block I b. The situation is now as illustrated in FIG. 10. Stack marks 14 and 16 are inserted both into the main store 10 and the cache store 12. The variable L is declared and assigned the value 7 which is inserted into the main store 10. Operations then proceed in an analogous manner to those described with reference to primary block I a.

FIG. 11 illustrates a so-called cache mechanism for implementing the system described above. The mechanism is used in conjunction with an information processing equipment such as a central processor 30 and has a main store 32, which is one word wide, a bit store 34, which is one bit wide and contains as many bits as the main store contains words, and a cache store 36 which is wide enough to contain a main store address and a main store data word in each cache store word. The cache store 36 corresponds to the cache store 12 of FIGS. 2 to 10 while the main store 32 and the bit store 34 together correspond to the main store 10 of FIGS. 2 to 10. Each of the stores 32, 34 and 36 has three control lines, a READ line to initiate a READ operation, a WRITE line to initiate a WRITE operation and a READY line to indicate that the store has completed the previous READ or WRITE operation.

Data is transferred between the central processor 30 and the various stores 32, 34 and 36 by a data highway 38 which contains eight data paths, each one word wide. Each data path carries a respective signal, P, Q, E, S, F, U, V and G and makes them available at the inputs of six registers R, E, A, H, C and D and a register block G.

Figure 12:
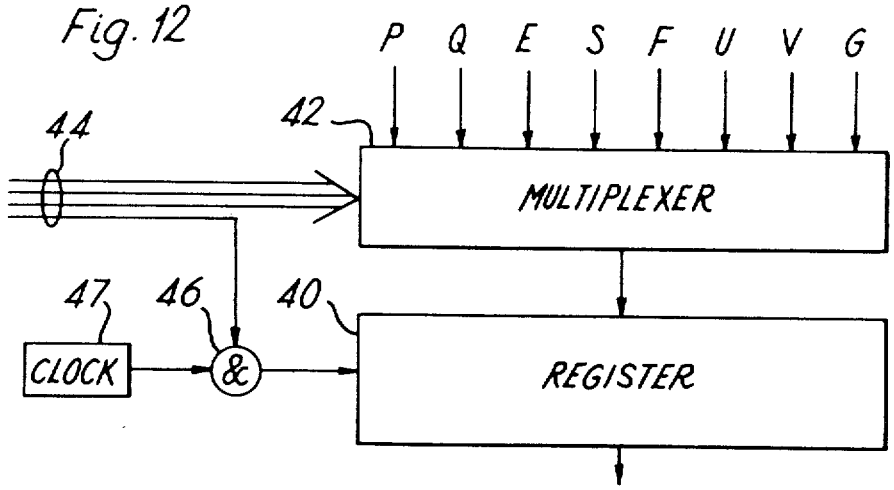
FIG. 12 is a block diagram illustrating part of the apparatus of FIG. 11 in more detail.

Referring to FIG. 12, each of the registers R, E, A, H, C and D comprises a dual rank (d type) register 40 which is one word wide. The input of the register 40 is connected to the output of an eight input multiplexer 42. Each input which is one word wide, is connected to a respective path of the highway 38 (FIG. 11). Operation of the multiplexer 42 is controlled by signals on a path 44 from the control logic of the apparatus. The path 44 also provides a control waveform which is combined with a signal from a clock 47 by an AND gate 46 to provide a strobe waveform for the register 40. The leading edge of the strobe waveform causes the register 40 to read the input from the multiplexer 42 and the trailing edge of the strobe waveform causes the register 40 to present this new state at its output.

Referring again to FIG. 11, the register block G has a multiplexer input from the data highway 38 similar to the multiplexer 42. In addition it contains five internal registers CM, CN, CO, CP and CQ and has a SELECT input to which signals SELECT CM, SELECT CN, SELECT CO, SELECT CP and SELECT CQ can be applied. The register selected is set when data is read into the register block G and presents its contents at the output of the register block G when data is to be read out.

The register CM is used to contain the address of the top stack mark in the cache store 36. This stack mark contains the address of the next stack mark beneath it and so on. The bottom stack mark contains an address which enables it to be identified as such.

The register CP contains the address of the empty word in the cashe store 36 immediately above the highest word currently in use, i.e. next available address in cache store 36. The register CN contains a copy of the previous value stored in the register CP, i.e. latest used address in cache store 36. This is used during the EXIT operation.

The register CO contains the address of a word in the top region of the cache 36 and is used during the third stage of the exit operation for scanning the top region of the cache as will be explained hereinafter.

The register CQ contains the address of the highest word of the cache store available for use.

The register R holds a data word which is to be returned to the central processor 30. The register E holds the address of the top stack mark in the main store 32. The top stack mark holds the address of the next stack mark and so on. The bottom stack mark contains an address which allows it to be identified as such. The A register holds the current main store address. It is used to address the bit store as well as the main store and its contents can be written into one side of the cache store.

The outputs of the register E and the register A are connected to a comparator 48 which provides an output signal Y when the output of the register A is greater than that of the register E. Thus, the signal Y indicates that the address now in register A is higher than the top stack mark and thus that the variable addressed by the address in the register A is local to the current recovery block.

The register H holds the data to be written into the main store 32.

The register C holds the address to be used for the cache store. In addition, its output is connected to the input of an Increment/Decrement unit 50 which has a control input FUN for receiving one of four control signals to cause the unit to produce an output signal F related to its input signal C as indicated in Table I.

Table I

| FUN | F |
|---|---|
| INCR | C + 1 |
| DECR | C − 1 |
| SAME | C |
| ZERO | 0 |

The register D holds part of the data to be written into the cache store 36, the other part of this data being in the register A.

The outputs of the register C and D are additionally connected to an equality unit 52 which produces an output signal Z when the values in the two registers C and D are equal.

In addition to the register R, the interface with the central processor 30 includes two data paths P and Q. The P data path carries the main store address which the central processor wishes to access and the Q data path carries the data which the central processor 30 wishes to store or which is to be entered into the registers of the device. An R data path, formed by the output of the register R, carries data being sent to the central processor 30.

The control logic of the apparatus will be explained more fully hereinafter. However, it will be convenient to describe at this point the control signals which pass between the control logic of the apparatus and the central processor 30.

The apparatus has two control signals which it can send to the central processor 30. READY indicates that the device has completed the operation requested by the processor 30 and ERROR indicates an error condition.

The central processor 30 is of conventional design so that, during the course of executing instructions, it generates control signals to direct conventional storage means to perform READ and WRITE actions. In addition, it includes means for generating control signals to cause the apparatus illustrated in FIG. 11 to perform additional actions relating to the use of recovery blocks and acceptance tests in programs. The apparatus can thus receive any one of thirteen control signals from the central processor causing it to perform actions as follows:

The READ action, fetching the value of the word to be read from the main store 32 with the appropriate virtual address;

The WRITE action, recording a new value for a variable;

The ENTRY action on entry to a recovery block;

The REVERSE operation, required when an acceptance test rejects a block;

The EXIT action on successful completion of an acceptance test;

The RESET action, resetting the mechanism to the state from which the central processor begins running a new program; and Seven operations, provided to enable the operating system, in the central processor to gain access to the various registers E, CM, CP and CQ, for instance for multiprogramming.

The control logic of the cache mechanism shown in FIG. 11 will now be described as a state machine according to Table II. State machine representation defines each state which the control logic can enter. These states are numbered in the left-hand column of the table.

For each state, the centre column of the table defines the control waveforms that are to be generated when the control logic is in this state. The waveforms which control the gating into the various registers are specified in the form P→A. This specifies that waveforms are to be generated both to cause the gating of data into the register A and to cause the corresponding multiplexer to select its P input.

The next state which the control logic is to assume is specified in the right-hand column of Table II. Where a single number appears in this column, this is the number of the next state which is to be assumed in all circumstances. If the control logic is required to enter differing states depending on the presence or absence of waveforms which it is able to sense, this is indicated in the manner illustrated by the following examples:

$\bar{Z} \rightarrow 3, Z \rightarrow 2$ which indicates that, if waveform Z is true then the next state is to be state 2 while if the waveform Z is false then the next state is to be state 3.

The control logic moves from one state to its next state at regular intervals defined by the clock 47 (FIG. 12). On switch on, the control logic is arranged to enter state 1.

Table II

| State | action | next state |
|---|---|---|
| | Initial and Final States | |
| 1 | | READ → 11, |
| | | WRITE → 13, |
| | | RESET → 21, |
| | | SET E → 31, |
| | | READ E → 32, |
| | | SET CP → 33, |
| | | READ CP → 34, |
| | | SET CM → 35, |
| | | READ CM → 36, |
| | | SET CQ → 37, |
| | | ENTRY → 41, |
| | | REVERSE → 51, |
| | | EXIT → 61, |
| | | other or no signal → 1. |
| 2 | ERROR | $\overline{\text{RESET}}$ → 2 |
| | | RESET → 21 |
| 3 | READY | 1 |
| | Read | |
| 11 | P → A | 12 |
| 12 | READ A, S → R | $\overline{\text{READY}}$ A · 12. |

Table II-continued

| State | action | next state |
|---|---|---|
| | Write | READY A → 3 |
| 13 | P → A, Q → H, SELECT CP, G → C | 14 |
| 14 | READ A, READ B, S → D | $\overline{\text{READY A}} . \overline{\text{READY B}}$ → 14 |
| | | READY A . READY B → 15 |
| 15 | | Y → 16, $\overline{Y}$ . X → 17 |
| | | $\overline{Y} + \overline{X}$ → 18 |
| 16 | WRITE A, WRITE B, UNSET | $\overline{\text{READY A}} . \overline{\text{READY B}}$ → 16 |
| | | READY A . READY B → 3 |
| 17 | WRITE A, WRITE B, SET | $\overline{\text{READY A}} . \overline{\text{READY B}}$ → 17 |
| | | READY A . READY B → 3 |
| 18 | WRITE A, WRITE B, SET, WRITE C, INCR, SELECT CP, F → G, F → C | $\overline{\text{READY A}} . \overline{\text{READY B}} . \overline{\text{READY C}}$ → 18 |
| | | READY A . READY B . READY C → 19 |
| 19 | SELECT CQ, G → D | 20 |
| 20 | | $\overline{Z}$ → 3, Z → 2 |
| | Cache Control Management | |
| 21 | ZERO, SELECT CM, F → G, F → E | 22 |
| 22 | ZERO, SELECT CN, F → G | 23 |
| 23 | ZERO, SELECT CP, F → G | 24 |
| 24 | ZERO, SELECT CQ, F → G, READY | 1 |
| | Central Processor Input/Output | |
| 31 | Q → E, READY | 1 |
| 32 | E → R | 3 |
| 33 | SELECT CP, Q → G, READY | 1 |
| 34 | SELECT CP, G → R | 3 |
| 35 | SELECT CM, Q → G, READY | 1 |
| 36 | SELECT CM, G → R | 3 |
| 37 | SELECT CQ, Q → G, READY | 1 |
| | Recovery Block Entry | |
| 41 | Q → E, SELECT CM, G → C | 42 |
| 42 | SELECT CP, G → D | 43 |
| 43 | INCR, F → C | 44 |
| 44 | | $\overline{Z}$ → 45, Z → 47 |
| 45 | READ C, U → A | $\overline{\text{READY C}}$ → 45, READY C → 46 |
| 46 | WRITE B, UNSET | $\overline{\text{READY B}}$ → 46, READY B → 43 |
| 47 | SELECT CM, G → D | 48 |
| 48 | WRITE C, SAME, SELECT CM, F → C, F → G | $\overline{\text{READY C}}$ → 48, READY C → 49 |
| 49 | INCR, SELECT CP, F → G | 19 |
| | Reverse | |
| 51 | Q E, SELECT CM, G → D | 52 |
| 52 | SELECT CP, G → C | 53 |
| 53 | DECR, F → C | 54 |
| 54 | | $\overline{Z}$ → 55, Z → 57 |
| 55 | READ C, U → A, V → H | $\overline{\text{READY C}}$ → 55, READY C → 56 |
| 56 | WRITE A, WRITE B, UNSET | $\overline{\text{READY A}} . \overline{\text{READY B}}$ → 56, READY A . READY B → 53 |
| 57 | INCR, SELECT CP, F → G, READY | 1 |
| | Exit | |
| 61 | SELECT CM, G → C, G → D, Q → E | 62 |
| 62 | SAME, SELECT CO, F → G | 63 |
| 63 | SELECT CP, G → C, SAME, F → G | 64 |
| 64 | SELECT CN, SAME, F → G | 65 |
| 65 | DECR, F → C | 66 |
| 66 | | $\overline{Z}$ → 67, Z → 69 |
| 67 | READ C, U → A | $\overline{\text{READY C}}$ → 67, READY C → 68 |
| 68 | WRITE B, UNSET | $\overline{\text{READY B}}$ → 68, READY B → 65 |
| 69 | READ C, SELECT CM, V → G, V → D | $\overline{\text{READY C}}$ → 69, READY C → 70 |
| 70 | DECR, F → C | 71 |
| 71 | | $\overline{Z}$ → 72, Z → 74 |
| 72 | READ C, U → A | $\overline{\text{READY C}}$ → 72, READY C → 73 |
| 73 | WRITE B, SET | $\overline{\text{READY B}}$ → 73, READY B → 70 |
| 74 | SELECT CO, G → C | 75 |
| 75 | INCR, F → C, SELECT CN, G → D | 76 |
| 76 | SAME, SELECT CO, F → G | $\overline{Z}$ → 77, Z → 3 |
| 77 | READ C, U → A, V → D | $\overline{\text{READY C}}$ → 77, READY C → 78 |
| 78 | READ B | $\overline{\text{READY B}}$ → 78, READY B → 79 |
| 79 | | $\overline{X} + \overline{Y}$ → 80, X + Y → 75 |
| 80 | SELECT CP, G → C, WRITE B, SET | $\overline{\text{READY B}}$ → 80, READY B → 81 |
| 81 | WRITE C | $\overline{\text{READY C}}$ → 81, READY C → 82 |
| 82 | INCR, SELECT CP, F → G | 74 |

State 1 detects the thirteen control signals from the central processor and initiates the appropriate action.

State 2 is an error state which forces the central processor 30 to reset.

States 11 and 12 perform the read action. The address from the central processor 30 is gated into register A during step 11 and the main store 32 is read and its output gated into the register R during state 12. If the main store 32 does not respond immediately, the control logic remains in state 12 until a response is obtained.

State 3 is used by many actions to send a READY response to the central processor 30 and to return to state 1.

States 13 to 20 perform the write action. States 13 and 14 read the bit flag of the word to be written and also its contents into the register D in case the word needs to be preserved in the cache store 36. State 15 determines whether the word addressed is local (next state 16), or already cached (next state 17) or being assigned to for the first time in this recovery block (next state 18). State 18 also records the prior value of the word and its address in the cache store 36, increments the value of the cache store pointer and returns it to the internal register CP within the register block G. States 19 and 20 test for the use of the last word of the cache store and can generate an error condition if an error exists.

States 21 to 24 are concerned with entering values in the internal registers of the register block G. Steps 31 to 37 are concerned with sending data to and from the central processor 30.

Steps 41 to 49 perform the recovery block entry operation. States 41 to 42 set the limits of the top region of the cache in the registers C and D. States 43 to 46 are a loop, counting up in the register C, to scan the top region of the cache, reading the address part of each cache entry so as to reset the bit flag of each corresponding main store word. Since a word can only have its bit set if there exists an entry for it in the top region of the cache, this resets all bit flags in the bit store 34. States 47 to 49 write the existing contents of the internal register CM into the cache store 36 to form a stack mark and generate new values for the addresses of the top cache mark (entered in register CM) and top of stack (entered in register CP).

States 51 to 57 perform the reverse operation to recovery block entry and are used to restore values of variables which had been modified in the recovery block after failure of an acceptance test. The states form a loop which is generally similar to that of states 41 to 46 except that the cache values recorded in the top region of the cache store 36 are re-written into the main store so as to erase the effects of the erroneous block. The state 57 adjusts the pointer to the top of the cache stack (stored in register CP).

States 61 to 82 perform the exit operation after successful completion of an acceptance test. States 61 to 64 preserve in registers CN and CO copies of the existing entries in register CP and CM respectively for subsequent use. States 61 to 64 also set the contents of register CM into the register CP to indicate what will be the top of the stack when the top region has been removed. The remaining states comprise three loops. States 65 to 68 scan the top cache region downwards from the top, unsetting the flag bits of all words cached in the top region of the cache store 36, i.e. all the flag bits set in the bit store 34. State 69 reads the cache stack mark between the top two regions of the cache store 36 and records this as the next cache marker in register CM and also in the register D to indicate the bottom of the second region of the cache. States 70 to 73 continue the scan down through the second region of the cache setting the flag bits of words cached in the second region in the bit store 34 (i.e. the flag bits removed by the previous entry operation). States 74 to 79 scan back up the top region of the cache to discover whether the items recorded in the top region are either now local (indicated by waveform Y), already present in the second region (indicated by waveform X) or must be copied from the top cache region into the second region. The register CO holds a pointer one less than the address of the next entry to be examined in the top region and register CN holds a pointer one greater than the address of the top entry in the top region. If the test at step 79 discovers that the cache entry is neither local nor already cached at this level, then steps 80 to 82 will re-write the cache entry into the cache store 36 at the address given by the cache stack top (register CP) which is then incremented. The flat bit of the word cached is also set.

The state machine may be implemented into equivalent logic hardware as described in T. C. Bartee et al "Theory and Design of Digital Machines", McGraw Hill, 1962. Alternatively the state machine control can be converted into a microprogram as described in S. S. Husson "Microprogramming, Principles and Practice", Prentice Hall 1970.

In an alternative embodiment of the invention, an additional register is provided which stores a number indicating the current "recovery level", i.e. the current depth of dynamic nesting of recovery blocks or, in other words, the number of regions of the cache (separated by stack markers) currently in use. This register is incremented and decremented by one on recovery block entry and exit respectively. The bit store 34 of the embodiment of the invention illustrated in FIG. 11 is replaced by a recovery level store for storing a recovery level for each value recorded in the main store 32. When a variable is entered into the cache store 36, both the value and the recovery level held in the corresponding word of the recovery level store are recorded so that a history of when the variable was previously entered in the cache or was declared local is recorded with each encachement of the variable (i.e. storing of that variable and its identity in the current top region of the cache store 36).

When a variable is declared and is allocated a location in the main store 32, the current recovery level is inserted into the corresponding part of the recovery level store. On entry to a recovery block, the recovery level register is incremented by one and a new mark is placed on the cache. No action is performed on the data stack in the main store.

On assignment of a new value to a variable, an investigation is first made to see whether the recovery level of the variable in the main store equals the current recovery level. If so, the new value is entered into the main store and no encachement is performed. The recovery level store is also left unaltered. If the recovery level of the variable does not indicate the current recovery level, a new entry is placed in the cache. This cache entry consists of the identity, the previous value and the previous recovery level of the variable as stored in the recovery level store. The new value is now entered into the main store and the recovery level in the recovery level store is made equal to the current recovery level.

On rejection by an acceptance test, the entries in the top region of the cache are processed one by one, their value and recovery level fields being copied back into the storage locations in the main store and recovery level store respectively designated by their identities.

The cache is retracted back to but not including the stack mark for this recovery block. The current recovery level remains unaltered.

After acceptance by an acceptance test, the current recovery level register is decremented by one. The entries in the top region of the cache are processed one by one. The recovery levels in the recovery level store words corresponding to the virtual addresses in entries in the top region of the cache are set equal to the current recovery level. Then if the recovery level of the cache entry equals the current recovery level, the entry is discarded. Otherwise, the entry is moved down into the next cache region.

Figure 13:
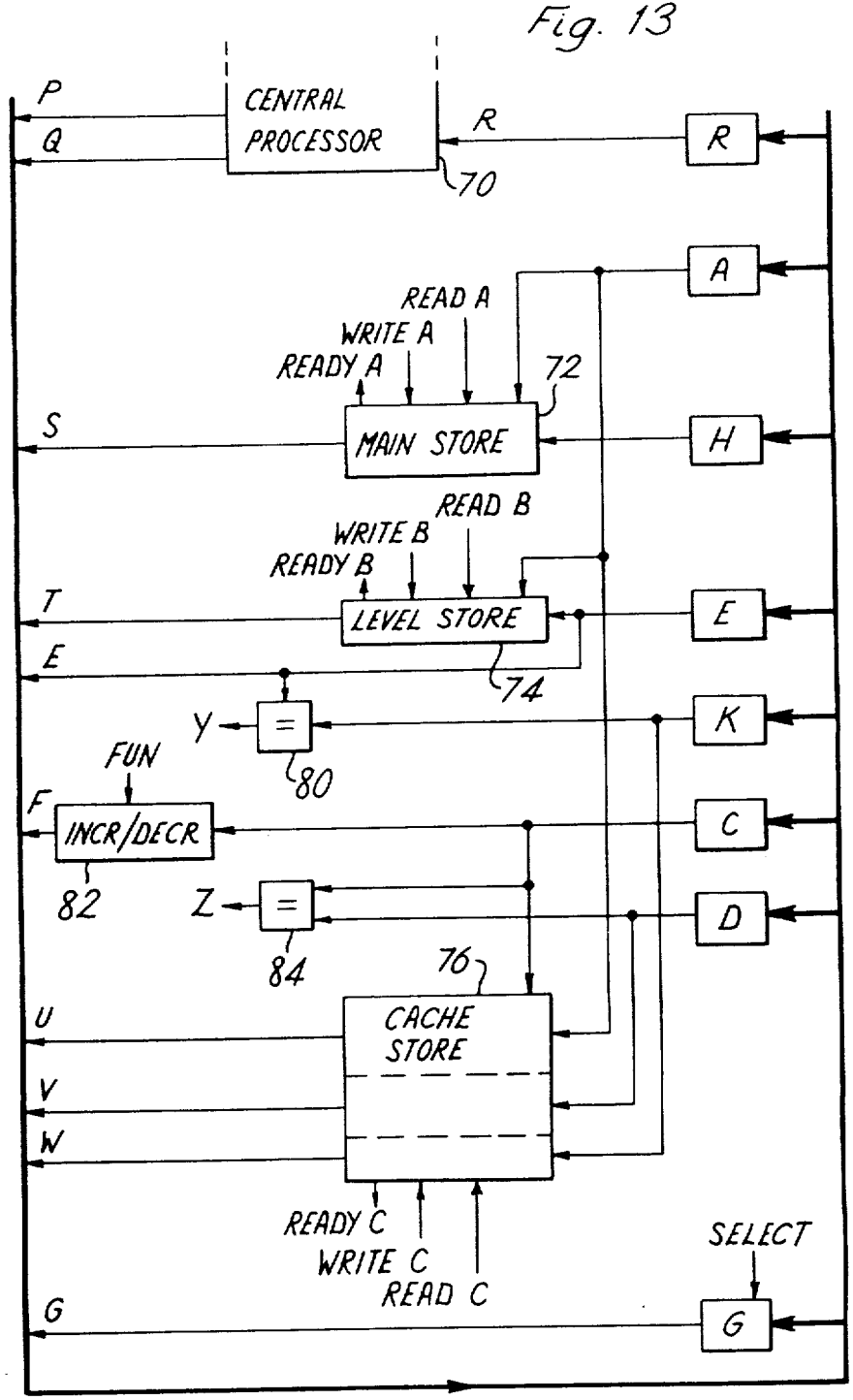
FIG. 13 is a block diagram of appartus in accordance with an embodiment of the invention alternative to that shown in FIG. 11.
Figure 15:
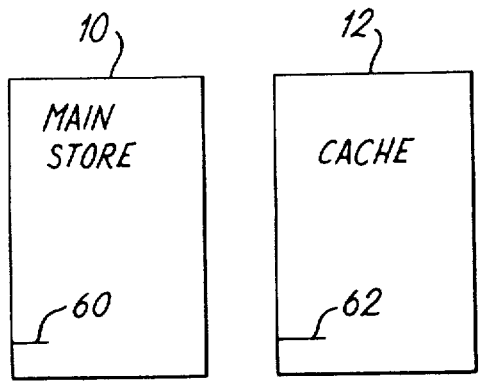
Figure 16:
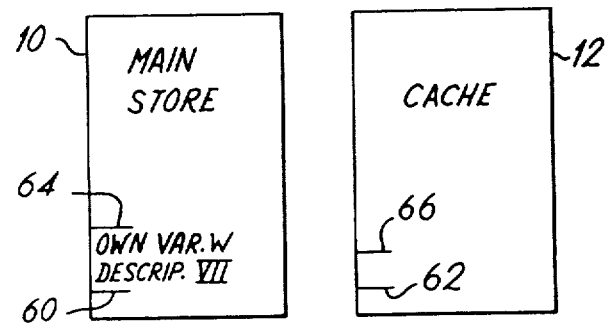

FIG. 13 is a block diagram of apparatus illustrating the above described embodiment utilising recovery levels and is equivalent to the block diagram of FIG. 11.

The apparatus illustrated in FIG. 13 is for use in conjunction with an information processing equipment such as a central processor 70. It has a main store 72, which is one word wide, a level store 74 which is wide enough to hold a recovery level number and contains as many words as the main store, and a cache store 76 which is wide enough to hold a main store word, a main store address and a level number. Each of the stores 72, 74 and 76 has three control lines, a READ LINE to initiate a READ OPERATION, a WRITE LINE to initiate a WRITE OPERATION and a READY LINE to indicate that the store has completed the previous READ or WRITE operation.

Data is transferred between the central processor 70 and the various stores 72, 74 and 76 by a data highway 78 which contains ten data paths, each one word wide. Each data path carries a respective signal P, Q, S, T, E, F, U, V, W and G and makes them available at the inputs of seven registers R, A, H, E, K, C, D and a register block G.

The registers R, A, H, E, K, C and D are of the type illustrated in FIG. 12 except that the multiplexer has provision for ten inputs instead of only eight.

As already explained, the need to cache a variable is determined by the relative values of the current recovery level number and the recovery level number of the variable in question. The register E is used to contain the current recovery level number. The value contained therein is set to zero when the apparatus is reset at the beginning of a program section and is adjusted automatically on recovery block entry and exit without involving the central processor 70. The register K is used to contain the recovery level number of a variable in the main store 72 or in the cache store 76 when a decision on encachement of such variable or preservation of its cache entry is to be taken.

The outputs of the registers E and K are connected to an equality unit 80, similar to the unit 52 of FIG. 11 which produces an output signal Y when the values stored in the registers E and K are equal.

As with the apparatus illustrated in FIG. 11, the register block G contains five internal registers CM, CN, CO, CP and CQ. The functions of these registers are similar to the corresponding registers of the register block G of FIG. 11 and will become apparent from the following description. However, the register CO is additionally used during the reverse operation to preserve the value of the current recovery level number.

The registers R, A, H, C and D perform similar functions to the corresponding registers of the apparatus illustrated in FIG. 11, the register R forming a data word which is to be returned to the central processor 70, the register A holding the main store address, the register H holding a data word to be written into the main store 72, the register C holding an address to be used for the cache store 76 and the register D holding data to be written into the cache store 76.

The output of the register C is connected to the input of an increment/decrement unit 82, similar to the unit 50 of the apparatus illustrated in FIG. 11. The unit 82 has a control input FUN for receiving one of four control signals to cause the unit to produce an output signal F related to its input signal C as indicated in Table I above.

The register D holds part of the data to be written into the cache store 36, the other parts of this data being in the registers A and K.

The outputs of the registers C and D are additionally connected to an equality unit 84 which produces an output signal Z when the values in the two registers C and D are equal.

In addition to the register R, the interface with the central processor 70 includes two data paths P and Q. The P data path carries the main store address which the central processor wishes to access and the Q data path carries the data which the central processor 70 wishes to store or which is to be entered into the registers of the device. An R data path, formed by the output of the register R, carries data being sent to the central processor 70.

The control logic of the cache mechanism shown in the drawing will now be described as a state machine according to Table III. State machine representation defines each state which the control logic can enter. These states are numbered in the left-hand column of the table.

For each state, the centre column of the table defines the control waveforms that are to be generated when the control logic is in this state. The waveforms which control the gating into the various registers are specified in the form P→A. This specifies that waveforms are to be generated both to cause the gating of data into the register A and to cause the corresponding multiplexer to select its P input.

The next state which the control logic is to assume is specified in the right-hand column of Table III. Where a single number appears in this column, this is the number of the next state which is to be assumed in all circumstances. If the control logic is required to enter differing states depending on the presence or absence of waveforms which it is able to sense, this is indicated in the manner illustrated by the following examples:

$Z \rightarrow 3, \bar{Z} \rightarrow 2$ which indicates that, if waveform Z is true then the next state is to be state 2 while if the waveform Z is false then the next state is to be state 3.

The control logic moves from one state to its next state at regular intervals defined by a clock associated with the registers R to G which is similar to the clock 47 (FIG. 12) of the above mentioned embodiment. On switch on, the control logic is arranged to enter state 1.

TABLE III

| State | Action | Next state |
|---|---|---|
| | Initial and Final States | |
| 1 | | READ → 19 |
| | | WRITE → 13 |
| | | RESET → 21 |
| | | SET E → 31 |
| | | READ E → 32 |
| | | SET CP → 33 |
| | | READ CP → 34 |
| | | SET CM → 35 |
| | | READ CM → 36 |
| | | SET CQ → 37 |
| | | ENTRY → 41 |
| | | REVERSE → 51 |
| | | EXIT → 61 |
| | | other or no signal → 1 |
| 2 | ERROR | $\overline{\text{RESET}}$ → 2 |
| | | RESET → 21 |
| 3 | READY | 1 |
| READ | | |
| 11 | P → A | 12 |
| 12 | READ A, S → R | $\overline{\text{READY A}}$ → 12 |
| | | READY A → 3 |
| WRITE | | |
| 13 | P → A, Q → H | 14 |
| | SELECT CP, G → C | |
| 14 | READ A, READ B, | $\overline{\text{READY A . READY B}}$ → 14 |
| | S → D, T → K | READY A . READY B → 15 |
| 15 | | Y → 16 |
| | | $\overline{Y}$ → 17 |
| 16 | WRITE A | $\overline{\text{READY A}}$ → 16 |
| | | READY A → 3 |
| 17 | WRITE A, WRITE B, WRITE C | $\overline{\text{READY A . READY B . READY C}}$ → 17 |
| | INCR, SELECT CP, F → G, F → C | READY A . READY B . READY C  18 |
| 18 | SELECT CQ, G → D | 19 |
| 19 | | $\overline{Z}$ → 3 |
| | | Z → 2 |
| | Cache control management | |
| 21 | ZERO, F → E | 22 |
| 22 | ZERO, SELECT CM, F → G | 23 |
| 23 | ZERO, SELECT CN, F → G | 24 |
| 24 | ZERO, SELECT CP, F → G | 25 |
| 25 | ZERO, SELECT CQ, F → G READY | 1 |
| | Central processor input/output | |
| 31 | Q → E, READY | 1 |
| 32 | E → R, | 3 |
| 33 | SELECT CP, Q → G READY | 1 |
| 34 | SELECT CP, G → R | 3 |
| 35 | SELECT CM, Q → G, READY | 1 |
| 36 | SELECT CM, G → R | 3 |
| 37 | SELECT CQ, Q → G, READY | 1 |
| | Recovery Block Entry | |
| 41 | E → C | 42 |
| 42 | INCR, F → E, F → K | 43 |
| 43 | SELECT CP, G → C | 44 |
| 44 | SELECT CM, G → D | 45 |
| 45 | WRITE C, SAME, SELECT CM, F → G | $\overline{\text{READY C}}$ → 45 |
| | | READY C → 46 |
| 46 | INCR, SELECT CP, F → C, F → G | 19 |
| | Reverse | |
| 51 | SELECT CO, E → G | 52 |
| 52 | SELECT CM, G → D | 53 |
| 53 | SELECT CP, G → G | 54 |
| 54 | DECR, F → C | 55 |
| 55 | | $\overline{Z}$ → 56 |
| | | Z → 58 |
| 56 | READ C, U → A, V → H, W → E | $\overline{\text{READY C}}$ → 56 |
| | | READY C → 57 |
| 57 | WRITE A, WRITE B | $\overline{\text{READY A . READY B}}$ → 57 |
| | | READY A . READY B → 54 |
| 58 | INCR, SELECT CP, F → G | 59 |
| 59 | SELECT CO, G → E | 3 |
| | Exit | |
| 61 | E → C | 62 |
| 62 | DECR, C → E | 63 |
| 63 | SELECT CP, G → C, G → D | 64 |
| 64 | SELECT CN, SAME, F → G | 65 |
| 65 | SELECT CM, G → C | 66 |

TABLE III-continued

| State | Action | Next state |
|---|---|---|
| 66 | READ C, SELECT CM, V · G | READY C̄ · 66<br>READY C · 67 |
| 67 | SELECT CP, SAME, F · G | 68 |
| 68 | INCR, F · C | Z̄ · 69<br>Z · 3 |
| 69 | READ C, U · A, V · D, W · K | READY C̄ · 69<br>READY C · 70 |
| 70 | | Ȳ · 71<br>· 76 |
| 71 | SELECT CO, SAME, F · G | 72 |
| 72 | SELECT CP, G · C | 73 |
| 73 | WRITE C | READY C̄ → 73<br>READY C → 74 |
| 74 | INCR, SELECT CP, F · G | 75 |
| 75 | SELECT CO, G · C | 76 |
| 76 | SELECT CN, G → D, WRITE B | READY B̄ → 76<br>READY B → 68 |

States 13 to 19 perform the write action. State 14 reads the contents of the word to be written and its associated level number into registers D and K respectively in case the word needs to be preserved. State 15 determines whether the word needs to be preserved (next State 17) or not (next State 16). State 18 writes the new value of the word and the current recovery level number into the main store and level store respectively and writes the prior value and its associated main store address and level number into the cache store. The cache store pointer is incremented and returned to the register CP within the register block G. States 18 and 19 test for the use of the last word of the cache store and can generate an error condition if an error exists.

States 21 and 25 are concerned with entering values in the internal registers of the register block G and with initialising the current recovery level register E. States 31-37 are concerned with sending data to and from the central processor.

States 41 and 46 perform the recovery block entry operation. States 41 and 42 increment the current recovery level number and set its new value in register E and K. States 43 to 46 write the existing contents of the internal register CM and the register K into the cache store to form a cache mark and generate new values for the addresses of the top cache mark (entered in register CM) and top of cache (entered in CP).

States 51 to 59 perform the reverse operation and are used to restore values of variables which have been modified in the recovery block after failure of an acceptance test. State 51 preserves the value of the current recovery level register E in the internal register CO. States 54 to 57 form a loop which scans the top region of the cache store. For each word in the top region of the cache store, states 56 and 57 read the main store address of a variable, its prior value and its prior recovery level into registers A, H and E respectively and write the prior value and recovery level into the main store and level store respectively. State 58 adjusts the pointer to the top of the cache stack (stored in register CP). State 59 restores the value of the current recovery level into the register E.

States 61 to 76 perform the exit operation after the successful completion of an acceptance test. States 61 and 62 decrement the current recovery level register E. States 63 and 64 preserve in CN the existing entry in register CP for subsequent use. States 65 and 66 read the back pointer from the top cache mark and enter it into the register CM as the address the top cache mark will have after the exit operation has been completed. State 67 enters into the register CP the address the top of the cache will have after the top region has been removed. States 68 to 76 form a loop scanning the top cache region from the bottom up. State 69 reads a word from the top cache region, setting the main store address of a variable, its prior value and prior recovery level into registers A, D and K respectively. In state 70, the prior recovery level in register K is compared with the recovery level of the recovery block to which exit is being made. If the recovery level numbers in registers K and E are equal (indicated by waveform Y) the cache entry under examination is discarded (next state 76). If the level numbers are unequal, the cache entry must be copied from the top region into the second region (next state 71). The register CO holds a pointer to the cache entry currently under examination and register CN holds a pointer one greater than the address of the top entry in the top region. If the test at step 70 discovers that the recovery level of the entry under examination does not equal the recovery level of the recovery block to which exit is being made, states 72 to 74 write the contents of registers A, D and K (i.e. a copy of the cache entry under examination) into the cache store at the address given by the cache stack top (register CP) which is then incremented. In state 76, the recovery level of the recovery block to which exit is being made is written into the level store word associated with the variable whose cache entry is being processed, recording the fact that the net effect of the recovery block being exited on that variable is that of an assignment in the containing recovery block.

The state machine may be implemented into equivalent logic hardware as described in T. C. Bartee, et al, "Theory and Design of Digital Machines", McGraw Hill, 1962. Alternatively the state machine control can be converted into a microprogram as described in S. S. Husson, "Microprogramming, Principles and Practice", Prentice Hall 1970.

The embodiment described above employing recovery levels requires more storage capacity but can provide quicker operation than the system described with reference to FIG. 11.

In the foregoing description, it has been assumed that the various items of information are the same size as the word length of the main store. The invention is also applicable to circumstances where the items of information are smaller than the word, in which case an assignment to even a single unit of information causes the whole word to be cached. The invention is also applicable when an item of information is bigger than a word, in which case more than one word has to be cached in order to preserve the value of an item of information.

We claim:

1. Data processing apparatus for use in data processes which utilize a nested set of program blocks, each program block being followed by an acceptance test before entry into a succeeding block or return to an outer enclosing block, said apparatus being operative to preserve the states that have been taken up by each of a plurality of items of information immediately prior to the beginning of each block where said items of information change state during such block so that the states of such items of information prevailing at the beginning of the block can be restored if required, said apparatus comprising:

first memory means for storing the current states of items of information;

means for storing indicators which distinguish successive program blocks and indicate entry into and exit from a program block;

second memory means for storing previous states of items of information including storing of indicators of the program blocks in which such states occurred;

means for generating a "pass" signal or a "fail" signal on completion of an acceptance test;

means for restoring the states of the memory means to that pertaining immediately prior to entry into a current program block if a "fail" signal is generated, said restoring means including means for discarding from the first memory means the items of information stored during the current program block, and means for transferring from the second memory means to the first memory means the states stored in the second memory means for the immediately preceding program block of those items of information which are discarded from the first memory means; and means for progressing the states of the memory means if a "pass" signal is generated, said progressing means including means for discarding from the second memory means at least those items of information local to the immediately preceding program block and those items of information for which entries already exist in second memory means in the immediately preceding program block.

2. The apparatus as claimed in claim 1 and including transfer means for transferring the previous stage of an item of information from the first memory means to the second memory means when the state of such item of information in the memory means is changed during a current program block.

3. The apparatus as claimed in claim 2 in which said transfer means functions for only the first change of state of an item of information during a current program block.

4. The apparatus as claimed in claim 2 and including means for associating an indicator with each item of information stored in the first memory means to indicate whether a previous state of that item of information is already stored in the second memory means during a current program block.

5. The apparatus as claimed in claim 4 in which the presence of an indicator inhibits operation of the transfer means.

6. The apparatus as claimed in claim 5 and adapted for use in data processes which comprise a nested set of program blocks and including separator means for separating items of information in a successive program block in a nest of program blocks items of information in a preceding program block of said set, said separator means being provided for both the first memory means and the second memory means.

7. The apparatus as claimed in claim 4 and adapted for use in data processes which comprise a nested set of program blocks in which the indicator also indicates the depth of nesting of a current program block in nest of program blocks.

8. The appratus as claimed in claim 1 in which the first memory means and the second memory means comprises stack-type storage means.

* * * * *